Charles H. Schurr, Homer C. Warner INVENTORS
BY Haygood and Van Horn ATTORNEYS

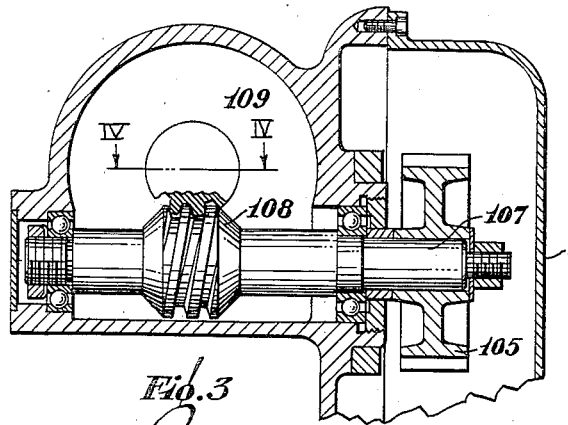
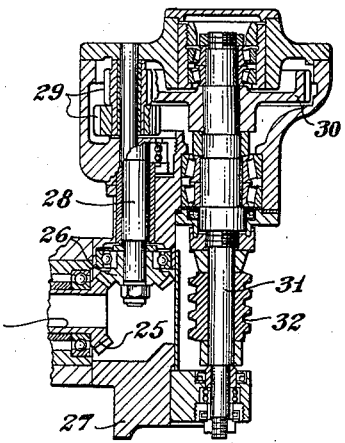
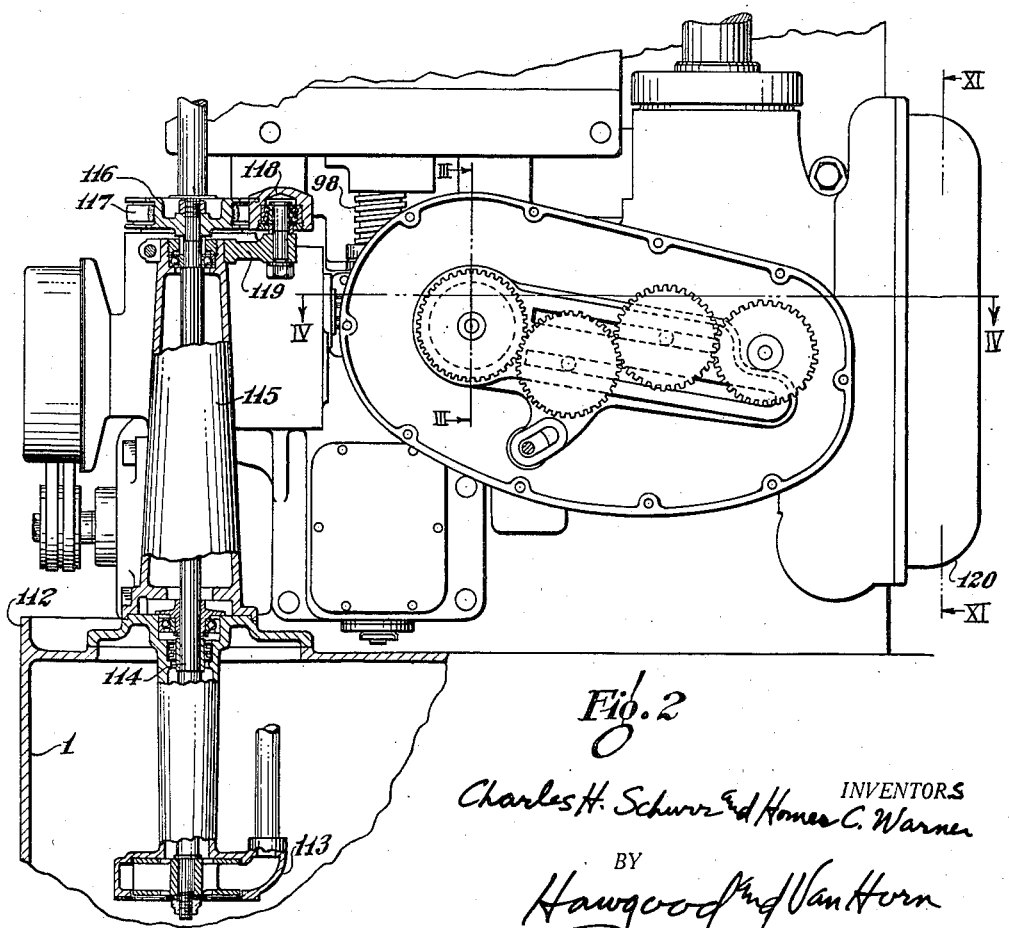

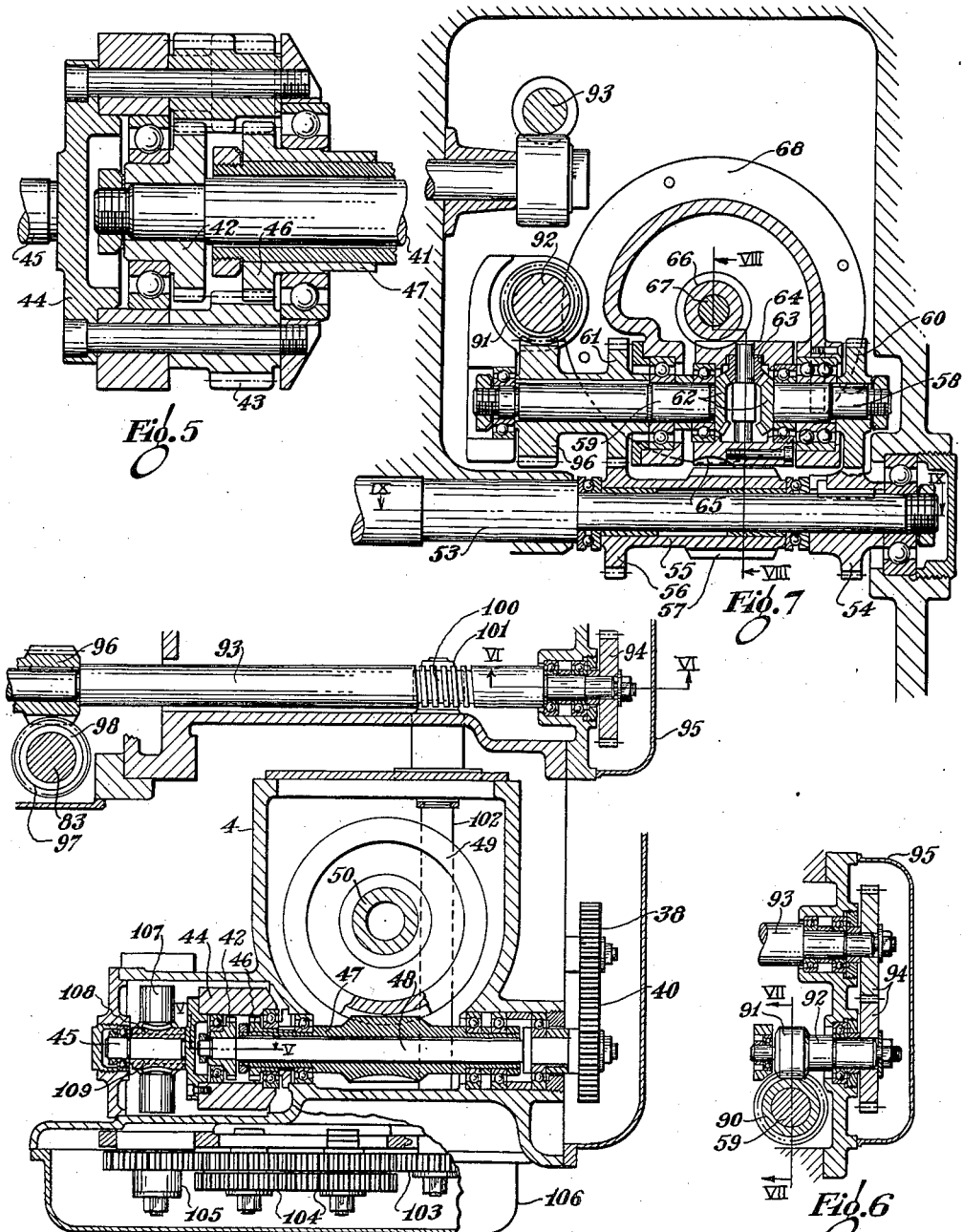

April 13, 1943.  C. H. SCHURR ET AL  2,316,367
HOBBING MACHINE
Filed Aug. 4, 1934  4 Sheets-Sheet 4
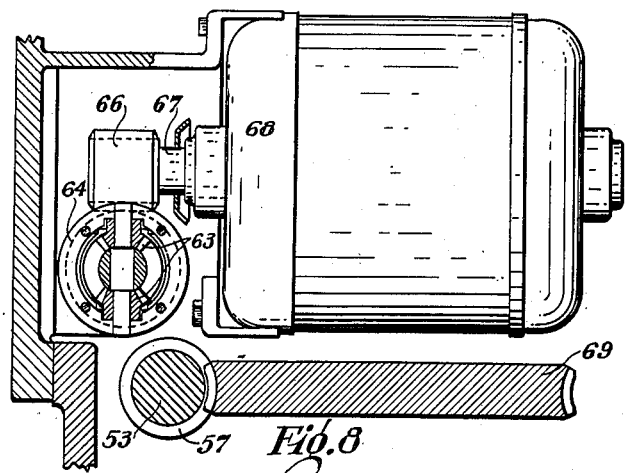
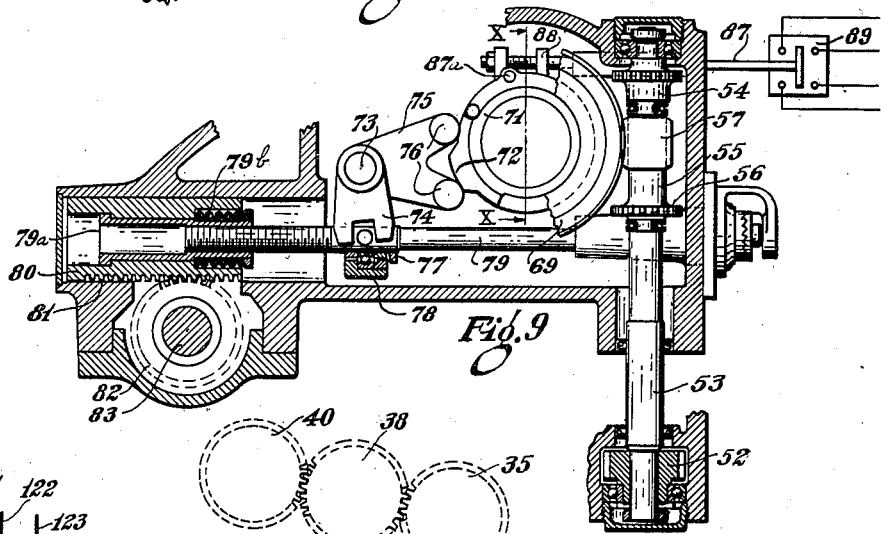
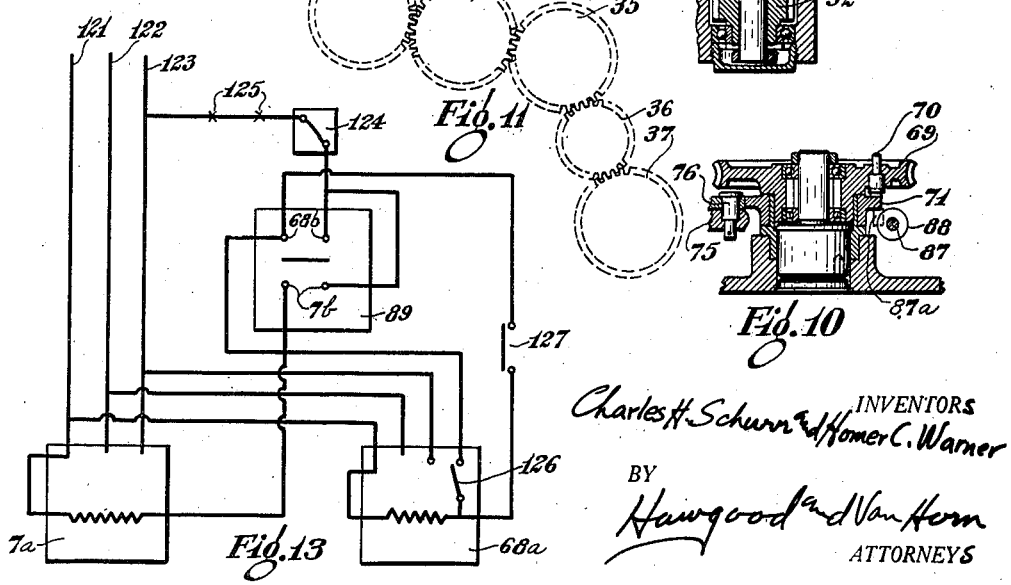

Patented Apr. 13, 1943

2,316,367

UNITED STATES PATENT OFFICE 2,316,367

HOBBING MACHINE

Charles H. Schurr and Homer C. Warner, Cleveland, Ohio, assignors to The Lees-Bradner Company, Cleveland, Ohio, a corporation of Ohio Application August 4, 1934, Serial No. 738,464

9 Claims. (Cl. 90—4)

This invention relates to machine tools and is particularly applicable to tools for cutting non-circular objects.

It is an object of the invention to provide an improved machine tool which will produce work of extreme accuracy.

Another object is to provide an improved machine tool which will be rapid in operation.

Another object is to provide an improved machine tool in which the positions of the work and tool will be at all times positively controlled.

Another object is to provide an improved machine tool which will be economical of floor space.

Another object is to provide an improved machine tool which will be silent in operation.

Another object is to provide an improved machine tool which may be easily operated.

Other objects will hereinafter appear.

The invention will be better understood from the description of one practical embodiment thereof, illustrated in the accompanying drawings, in which;

Figure 2 is a fragmentary front view with parts broken away and parts in section of the machine tool showing parts overlying those of Figure 1;

Figure 3 is a fragmentary sectional view taken on line III—III of Figure 2;

Figure 4 is a fragmentary plan sectional view taken on the line IV—IV of Figure 2;

Figure 5 is an enlarged fragmentary view of parts illustrated in Figure 4;

Figure 6 is a fragmentary sectional view taken on the line VI—VI of Figure 4;

Figure 7 is a fragmentary sectional view taken on the line VII—VII of Figure 6 to an enlarged scale;

Figure 8 is a fragmentary sectional view taken on the line VIII—VIII of Figure 7;

Figure 9 is a fragmentary sectional view taken on the line IX—IX of Figure 7;

Figure 10 is a fragmentary sectional view taken on the line X—X of Figure 9;

Figure 11 is a sectional view taken on the line XI—XI of Figure 1;

Figure 12 is a fragmentary sectional view taken on the line XII—XII of Figure 1; and Figure 13 is a diagrammatic view of the electrical connections of the apparatus.

Figure 1:
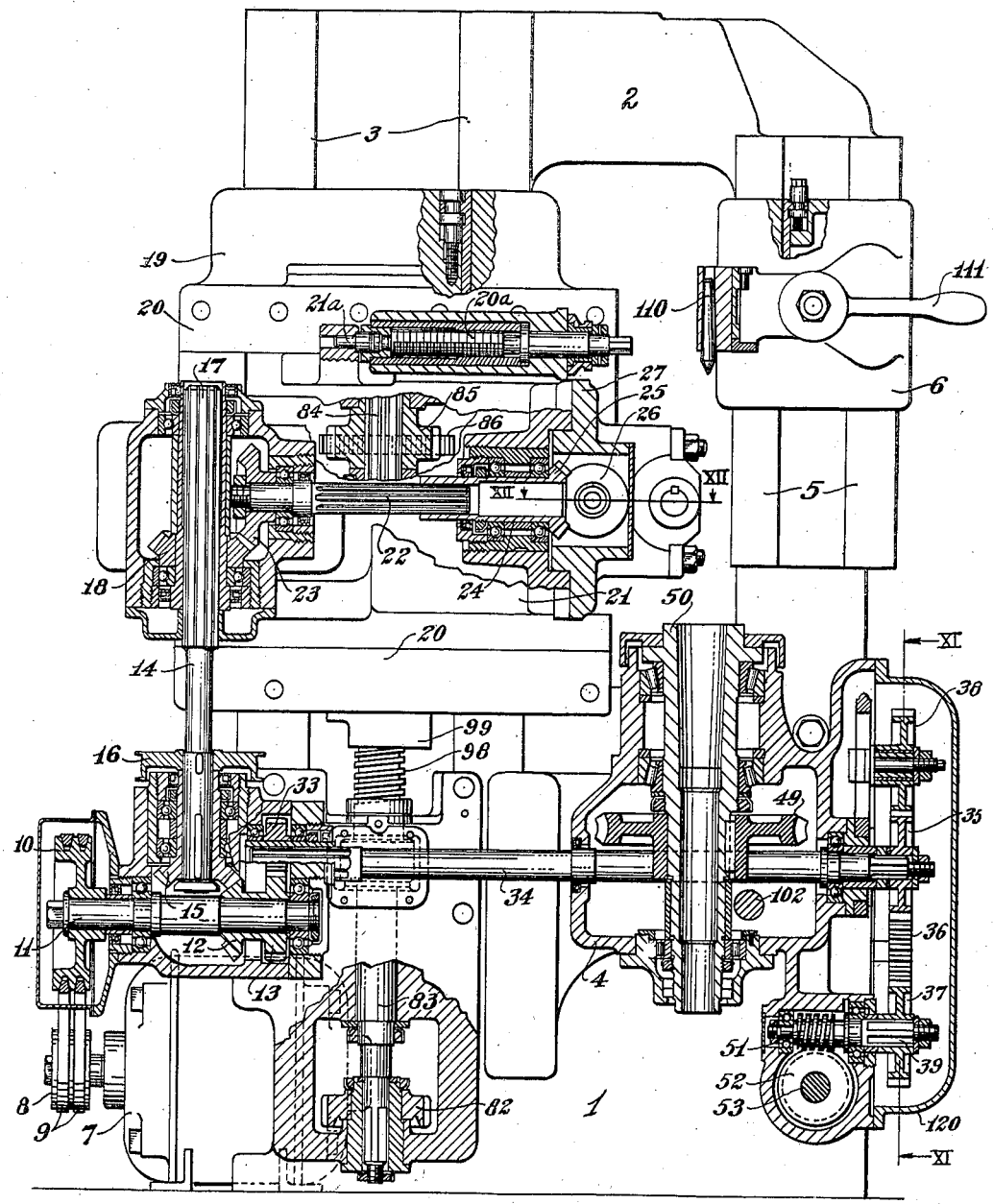
Figure 1 is a front elevational view, parts being broken away and parts being shown in section, of a machine tool embodying the invention and designed for the production of gears and similar articles.

The machine illustrated consists of a supporting base 1 upon which is mounted a frame 2. The frame 2 is formed with upwardly extending ways 3 upon which are slidably mounted the tool head and its associated mechanism, to be further described hereinafter.

The frame also has formed upon it a hollow projecting casing portion 4 in which are mounted the parts of the mechanism which support and control the work, and vertical ways 5 upon which are slidably carried a tail stock 6.

Mounted upon the base 1 is the main driving motor 7, shown as provided with a pulley 8 from which belts 9 pass to a pulley 10 secured to the end of a horizontal shaft 11 journaled in the frame. Also secured to the shaft 11 are a bevelled gear 12 and a spur gear 13, from the former of which power is transmitted to the cutter or tool and from the latter to the work, lead, and feed mechanisms.

Mounted in bearings on the frame is a vertically extending shaft 14 having keyed to its lower end a bevelled gear 15 meshing with bevelled gear 12 and also having keyed to it a pulley 16 for driving the pumping mechanism which will be hereinafter described.

The upper end of the shaft 14 is splined as indicated at 17, and slidable upon it is a bevelled gear 18 which is mounted in bearings in a carriage 19 engaging the ways 3 above referred to.

The carriage 19 is itself provided with horizontal ways 20 upon which is mounted a slide 21. A horizontal shaft 22 is mounted in bearings upon carrier 19 and provided with a bevelled gear 23 meshing with gear 18. This shaft is splined to telescopically engage with a horizontal shaft 24 having complementary splines and mounted in bearings within the slide 21.

The end of shaft 24 remote from shaft 22 has formed integrally with it a bevelled gear 25 which meshes with a bevelled gear 26 carried by a tool supporting head 27 which is secured to the end of the slide 21 by bolts or the like so as to be angularly adjustable about the axis of shafts 22 and 24. This gear is keyed to a shaft 28 which, through reduction gearing 29, drives a gear 30 keyed to the cutter spindle 31 which is supported in bearings in head 27 parallel to shaft 28 and is shown provided with a hob 32.

Meshing with gear 13 is a gear 33 splined to a horizontal shaft 34 journalled in the frame 2 and extending through housing 4. The outer end of this shaft is provided with a change gear 35 which drives, through change gears 36 and 37, horizontal shaft 39.

An idler 38 meshes with gear 35 and with a gear 40 secured to a horizontal shaft 41 to which is also keyed a gear 42, forming a part of a differential mechanism most clearly shown in Figure 5.

The differential mechanism includes idlers 43 journalled in a cage 44, supported by a shaft 45 coaxial with shaft 41 and driven by means to be hereinafter explained, and also a gear 46 keyed to a hollow shaft 47 surrounding shaft 41 and provided with a worm 48 which meshes with a worm wheel 49. The worm wheel 49 is keyed to a vertically extending work spindle 50, mounted in suitable bearings in housing 4.

From the above, it will be apparent that when motor 7 is operated it drives, through pulley 8, belts 9, and pulley 10, the shaft 11. To this is positively connected, by gears 12, 15, shaft 14, gears 18 and 23, shafts 22 and 24, gears 25 and 26, shaft 28, and gears 29 and 30, the cutter spindle 31. Hence there is imparted to the cutter 32 a rotation which is always in fixed relation to the rotation of shaft 11.

Also, power is transmitted from shaft 11 through gears 13 and 33, shaft 34, gears 35, 38 and 40, shaft 41, gears 42, 43 and 46, shaft 47, worm 48, and worm wheel 49, to the work spindle 50, this rotation also being directly related to the rotation of shaft 11 excepting for any such variation as may be produced by the rotation of differential cage 44 by shaft 45.

Thus the two trains of gearing already described produce the proper relative rotation of hob and work which would be necessary to generate gear teeth upon a work blank mounted on spindle 50, and if the gear to be produced is of the ordinary spur type having teeth parallel its axis, no increment of rotation need be added to the differential mechanism referred to, but it would be only necessary, if the face of the gear were wide, to provide an axial feed or lead movement of the cutter relative the work in the direction of the axis of the latter.

However, as it is desired that the machine tool may be used in the production of other types of products, such as gears having helically disposed teeth, means have been provided for imparting an increment of rotation related to the relative position of the tool axially of the work.

As previously mentioned, the change gears 36 and 37 drive a horizontal shaft 39 mounted within the frame of the machine. This shaft is provided with a worm 51 meshing with a worm wheel 52 secured to a shaft 53 horizontally journalled in the frame and extending transversely of the machine, as most clearly shown in Figures 1, 7 and 9. Keyed to shaft 53 is a gear 54 and rotatably mounted on the shaft is a sleeve 55 on the exterior of which are formed a gear 56 and a worm 57.

Parallel to shaft 53 and mounted above it are two coaxial shafts 58 and 59, the former having keyed to it a gear 60 meshing with gear 54 and the latter a gear 61 meshing with gear 56. The adjacent ends of these shafts are provided with bevelled pinions 62 which form parts of a differential mechanism including idler bevelled pinions 63 and a cage 64. The latter has formed on its exterior a worm wheel 65 with which meshes a worm 66 secured to the shaft 67 of an electric motor 68.

The worm 57 meshes with a worm wheel 69 which has passing through it a pin 70, while mounted coaxially with the worm wheel is a cam 71 having a radially extending projection 72. Projections on the upper surface of the cam lie in the path of the lower end of pin 70, so that as the worm wheel 69 is moved in one direction the pin will contact in one of these projections and move the cam with it, while upon reversal of the worm wheel, the pin will be retracted from the projection, allowing the cam to remain in stationary position until the pin has reached another projection which it contacts to move the cam in the opposite direction. Hence, by proper adjustment of the abutments upon the cam, the worm wheel may make an oscillation of any desired number of degrees less than a complete revolution, while the cam need only move through a relatively few degrees.

Mounted upon a vertical pivot 73 is a bell crank lever having a bifurcated arm 74 and an arm 75 provided with two rollers 76 arranged in the path of cam 72, so that the lever will be swung in one direction when projection 72 engages one roller and in the other when this projection engages the other.

The projection 72 is formed concentrically of the cam axis and so provides a quick movement of the rollers in either direction, after which, and during the cutting or return stroke, one or the other of these rollers dwells upon this concentric surface.

The forked end of arm 74 embraces a pin 77 carried by a collar 78 adjustably secured to a rod 79 which is horizontally supported for axial reciprocation within the frame. Secured to the rod, as by a threaded sleeve 79a, is a slide 80 provided on one surface with rack teeth 81 engaging the gear 82 fixed to a vertical shaft 83. A spring 79b is interposed between the sleeve and slide to permit a small relative movement of these parts. The shaft 83 extends upward within the carriage 19 where its upper end is splined as indicated at 84 and carries a gear 85 meshing with a rack 86 secured to the slide 21. Therefore, when the rod 79 is reciprocated, it rotates shaft 83 which in turn, through the gear 85 and rack 86, moves the slide toward or from the work, serving to feed the cutter into depth and to retract it after the cutting operation has been completed.

An adjustable stop 20a is secured to the carriage in position to engage an abutment 21a on the slide, and so positively limit the depth to which the cutter may be fed. The parts are so adjusted that at all times while cutting, the abutment is pressed against the stop by the compression of spring 79b.

Slidable through the frame is a horizontal rod 87 extending closely adjacent the downwardly projecting pin 87a secured in the cam 71 and provided with two collars 88 in the path of the pin. The outer end of the rod is connected to an electric switch 89 and serves to control motors 7 and 68 in a manner which will be hereinafter described.

Keyed to shaft 59 is a skew gear 90 meshing with a gear 91 secured to a shaft 92 which extends to the exterior of the frame. Here it is connected with a parallel shaft 93 by change gears 94, these being enclosed within a cover 95.

The shaft 93 has keyed to it adjacent its end remote from change gears 94 a skew gear 96 which meshes with a skew gear 97 formed upon a hollow lead screw 98 which is positioned around shaft 83 and journalled in the frame. This lead screw is threaded through a nut 99 secured to carriage 19 and serves to impart lead or feed movement to the tool by moving the carriage up and down upon ways 3.

It will thus be seen that, through worm wheel 69, worm 57, gears 56, 61, 90 and 91, shaft 92, change gears 94, shaft 93, gears 96 and 97, the lead screw 98 is positively connected to worm wheel 69, and that if motor 68 remains stationary these parts are geared back through gears 62, 63, 60 and 54, shaft 53, worm wheel 52, worm 51, change gears 36 and 37, to shaft 34, which, as above pointed out, constitutes part of the positive drive between the tool and cutter.

Cut into the shaft 93 is a worm 100 which meshes with a worm wheel 101 secured to a transverse horizontal shaft 102. This shaft extends through the frame passing beneath worm wheel 49 to the exterior of the frame where it is provided with a gear 103, which drives, through change gears 104, a gear 105. These gears are enclosed within a cover 106 secured to the frame.

Gear 105 is keyed to a shaft 107 extending within the frame provided with a worm 108 meshing with a worm wheel 109. The worm wheel 109 is keyed to shaft 45 which, as above mentioned, carries the cage of the differential mechanism shown in Figure 5. It will thus be seen that this cage is positively geared to the shaft 93 and so is controlled in its motion by the lead or feed of the tool axially of the work.

By suitably selecting change gears 104, the cage 44 may therefore be rotated to add any desired increment to the rotation of the work spindle in proportion to the axial travel of the tool, thus simply providing for producing gears of any desired helix angle. If gears having teeth parallel their axes are desired, the change gears 104 may be omitted, and the worm 108 locked against rotation, which may be accomplished by having a low pitched worm which will be self-locking, or by any other desired means.

Motor 7 is of relatively high power and low speed in comparison with motor 68, as its function is to drive the mechanism while performing its work, while the function of the latter mentioned motor is to drive the parts on their return, and it may therefore be of less power and drive at a higher speed.

When motor 7 is being actuated and motor 68 is stationary, the latter, having a low-pitched worm at 66, locks the cage 64 against rotation, so that differential mechanism at this point acts merely as a set of idler gears, the various drives from shaft 11 being as above described.

When, however, motor 7 is allowed to remain stationary and motor 68 is operated, cage 64 is driven by worm 66. Worm 51 locks, due to its low pitch, worm wheel 52 and shaft 53. Power is therefore transmitted through gears 61 and 90, the former driving, through gear 56, worm 57, and worm wheel 69, the cam 71 which actuates the feed of the slide and the switch 89. At the same time that this is happening, through gears 90 and 91, shaft 92, gears 94, shaft 93, gears 96 and 97, the power rotates lead screw 98 to return the slide to its starting position. The rotation of shaft 93, through worm 100, worm wheel 101, shaft 102, gears 103 to 105, worm 107, worm wheel 108, rotates cage 44 to impart an increment of rotation to the work spindle, at all times proportional to the elevation of the carriage upon the frame.

At the end of the operation of motor 68, the switch 89 is actuated to break the circuit through this motor and to make that to motor 7. The latter then proceeds to drive throughout the working stroke, and after the cut has been completed, to back the cutter out, at which time the switch 89 is actuated to break the circuit of motor 7.

The worm wheel 69 of course rotates in an opposite direction when parts are being driven by motor 7 than when they are being driven by motor 68.

As best illustrated in Figure 1, the tail stock consists of a slide 6, mounted upon vertical ways 5 on the frame. This tail stock is provided with a dead center 110 and with means for clamping the stock in place consisting of a bolt or cam provided with an actuating handle 111. The dead center is, of course, in axial alignment with the work spindle 50.

The base 1 is provided with an upwardly extending marginal flange 112 which forms a trough upon the top of the base adapted to catch coolant and direct it into the hollow of the base which constitutes, in effect, a tank for this material. Within this hollow of the base is a pump 113 provided with a vertically extending shaft 114 supported in a column or pedestal 115 which extends above the base. The upper end of the shaft is provided with a pulley 116 around which passes a belt 117 and is driven by pulley 16 mounted on shaft 14. The belt is maintained taut by an idler pulley 118 adjustably carried upon an arm 119.

A cover 120 is secured to the frame and encloses gears 35 to 38 and 40.

In Figure 13, the electric circuits controlling motors 7 and 68 are illustrated. Power is supplied by electric supply lines 121, 122 and 123, from the latter of which it is led through a manually openable safety switch 124 and limit safety switches 125 to the switch 89. The latter switch controls the relays 7a and 68a, associated with the motors 7 and 68 respectively, so that when moved to contacts 7b the former relay is actuated to supply electricity to motor 7, and when moved to contact 68b current is supplied to relay 68a, operating motor 68. In one line to relay 68a is a magnetic hold-in switch 126 which is automatically opened when the circuit to this relay is broken. Hence, when switch 89 moves from contacts 7b to contacts 68b, both motors are stopped. Arranged in parallel with switch 126 is a manually operable starting switch 127, such as a push button, which may be closed to furnish energy to relay 68a and start motor 68. This current closes switch 126 which remains closed until switch 89 is actuated by the cam mechanism above described.

The cycle of operation is as follows: With both motors stopped and contacts 68b closed, the operator inserts a piece of work in work spindle 50. He then presses switch 127 which supplies current to relay 68a, starting motor 68 and closing switch 126. The motor 68 returns the cutter to the position for starting the cut and as it very nearly reaches this position, actuates the cam 71 to feed it in to depth. Just as this is done, it actuates switch 89 to close contacts 7b and open contacts 68b. This, of course, actuates both relays, stopping motor 68 and starting motor 7, which drives the parts to perform the cut and then to back out the cutter when it actuates the switch 89, moving it to open contacts 7b and to close contacts 68b. This, as above mentioned, stops both motors, which, after removing the finished piece of work and supplying a new one, the operator can again start on their cycle by switch 127.

While a single machine unit is shown, a plurality of units may be assembled into one machine, as by being mounted on a turntable or turret, such for instance as that shown in our copending application Serial No. 567,276, filed October 6, 1931, which has matured into Patent 2,075,489, of March 30, 1937.

While we have described the illustrated embodiment of our invention in some particularity, obviously many other embodiments, variations and modifications thereof will readily occur to those skilled in this art, and we do not, therefore, limit ourselves to the precise details shown and described herein, but claim as our invention all embodiments, variations and modifications coming within the scope of the subjoined claims.

We claim:

1. A machine tool comprising a work spindle and a tool spindle, positive gearing between said spindles, a differential in said gearing, means for feeding said tool and work spindles relative each other, gearing connected to said first mentioned gearing and to said feed means and including a differential, a source of power connected to said first mentioned gearing, connections between said feed means and said first mentioned differential, and a second source of power connected to one element of said second mentioned differential.

2. A machine tool comprising a rotatable work spindle and a rotatable tool spindle, positive gearing between said spindles including a differential, a source of power connected to said gearing, a gear train connected to said first mentioned gearing and including a second differential, a second source of power connected to one element of said second mentioned differential, lead and feed means operated by said second mentioned gearing beyond said differential, and positive gearing between said lead and feed means and said first mentioned differential.

3. A machine tool including a work spindle and a tool spindle both adapted to rotate at relatively low speeds, speed reduction gearing closely adjacent and connected to the work spindle, speed reduction gearing closely adjacent and connected to the tool spindle, positive driving connections between said speed reduction gearings causing the spindles to rotate in predetermined relation, said driving connections operating at relatively high speed, means for moving said spindles relative each other connected to said driving connections, means interposed in said driving connections varying the relative rotation of said spindles and operated by the motion of the spindles relative each other, a differential included in said driving connections, a driving means connected to an element of the differential, and another driving means connected to another element of the differential.

4. A hobbing machine having a work spindle and a tool spindle, comprising a drive positively connected to both said spindles and including a differential mechanism, a power delivering means, a non-reversible power transmitting means connecting said power delivering means to said differential, a second power delivering means, and a second non-reversible power transmitting means connecting said second mentioned power delivering means to said mechanism.

5. A hobbing machine having a work spindle and a tool spindle, comprising a drive positively connected to both said spindles and including a differential mechanism, a power delivering means, a non-reversible power transmitting means connecting said power delivering means to said differential, a second power delivering means, and a second non-reversible power transmitting means connecting said second mentioned power delivering means to said mechanism, and controlling means arranged to operate said two power delivering means.

6. A hobbing machine including a work spindle and a tool spindle, both adapted to rotate at relatively low speeds, positive speed reduction gearing closely adjacent and connected to the work spindle, positive speed reduction gearing closely adjacent and connected to the tool spindle, positive driving connections between said speed reduction gearings causing said spindles to rotate in predetermined relation and operating at relatively high speed, a differential interposed in said driving connections, a power delivering means connected to one element of said differential, and a second power delivering means connected to another element of the differential.

7. A hobbing machine including a work spindle and a tool spindle, both adapted to rotate at relatively low speeds, positive speed reduction gearing closely adjacent and connected to the work spindle, positive speed reduction gearing closely adjacent and connected to the tool spindle, positive driving connections between said speed reduction gearings causing said spindles to rotate in predetermined relation and operating at relatively high speed, a differential interposed in said driving connections, a power delivering means connected to one element of said differential, and a second power delivering means connected to another element of the differential, each of the connections between the power delivering means and the differential including a non-reversible power transmitting means.

8. A hobbing machine comprising a work spindle and a tool spindle, driving connections connecting said spindles, feed means arranged to move the spindles relative each other in the direction of the axis of one of them, second feed means arranged to move said spindles relative each other in a direction transverse said axis, a power delivering means connected to said spindles and to both said feed means, a second power delivering means independently connected to both said feed means and to one of the spindles, and controlling means selectively controlling both said power delivering means.

9. A hobbing machine comprising a work spindle and a tool spindle, feed means arranged to move said spindles relative each other, positive power transmitting means between the spindles causing them to rotate in predetermined relation, said power transmission including a differential having one element connected to said feed means, driving means connected to said power transmission mechanism to rotate both spindles and operate said feed means, and a separate driving means connected to said feed means.

CHARLES H. SCHURR.
HOMER C. WARNER.